United States Patent
Hellstrom et al.

(10) Patent No.: US 10,920,689 B2
(45) Date of Patent: Feb. 16, 2021

(54) METHODS AND SYSTEM FOR IMPROVING TRANSIENT TORQUE RESPONSE

(71) Applicant: Ford Global Technologies, LLC, Dearborn, MI (US)

(72) Inventors: John Erik Mikael Hellstrom, Ann Arbor, MI (US); Mrdjan J. Jankovic, Birmingham, MI (US); Michael Howard Shelby, Plymouth, MI (US); John Eric Rollinger, Troy, MI (US); Adam J. Richards, Canton, MI (US); Paul A. Pietrzyk, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 681 days.

(21) Appl. No.: 15/484,022

(22) Filed: Apr. 10, 2017

(65) Prior Publication Data
US 2018/0291823 A1 Oct. 11, 2018

(51) Int. Cl.
| F02D 41/00 | (2006.01) |
| F02D 11/10 | (2006.01) |
| F02M 26/05 | (2016.01) |
| F02B 37/18 | (2006.01) |
| F02D 41/14 | (2006.01) |

(52) U.S. Cl.
CPC ......... *F02D 41/0007* (2013.01); *F02B 37/18* (2013.01); *F02D 11/105* (2013.01); *F02D 41/005* (2013.01); *F02D 41/0052* (2013.01); *F02M 26/05* (2016.02); *F02D 2041/002* (2013.01); *F02D 2041/0017* (2013.01); *F02D 2041/1412* (2013.01); *F02D 2200/60* (2013.01); *F02D 2200/701* (2013.01); *F02D 2200/702* (2013.01); *Y02T 10/12* (2013.01)

(58) Field of Classification Search
CPC ............... F02D 41/0007; F02D 41/005; F02D 41/0052; F02D 2041/0017; F02D 2041/002; F02D 2041/1412; F02D 11/105; F02D 11/106; F02D 2200/60; F02D 2200/602; F02D 2200/701; F02D 2200/702; F02B 37/18; Y02T 10/144; F02M 26/02–10
See application file for complete search history.

(56) References Cited

U.S. PATENT DOCUMENTS

| 6,178,749 B1 | 1/2001 | Kolmanovsky et al. |
| 6,237,563 B1 * | 5/2001 | Froehlich ............ F02D 11/105 123/350 |
| 6,692,406 B2 * | 2/2004 | Beaty .................... B60W 10/06 477/109 |
| 8,997,484 B2 | 4/2015 | Rollinger et al. |
| 9,175,629 B2 | 11/2015 | Cunningham et al. |

(Continued)

*Primary Examiner* — Laert Dounis
(74) *Attorney, Agent, or Firm* — Geoffrey Brumbaugh; McCoy Russell LLP

(57) ABSTRACT

Methods and systems are provided for improving engine torque response during transient condition. In one example, a method may include adjusting intake throttle and exhaust waste-gate valve based on the operator torque demand and concurrently, scheduling exhaust gas recirculation (EGR) and variable cam timing (VCT) based on a predicted torque shortfall ratio. The scheduling of EGR and VCT is independent of the actual position of intake throttle and exhaust waste-gate valve.

20 Claims, 6 Drawing Sheets

(56) References Cited

U.S. PATENT DOCUMENTS

| | | | |
|---|---|---|---|
| 2006/0218898 A1* | 10/2006 | Satou | F02D 41/10 60/285 |
| 2006/0229158 A1* | 10/2006 | Ichihara | F02D 11/105 477/185 |
| 2008/0078176 A1 | 4/2008 | de Ojeda | |
| 2011/0045948 A1* | 2/2011 | Doering | B60W 10/06 477/33 |
| 2013/0305715 A1 | 11/2013 | Rollinger et al. | |
| 2014/0000556 A1* | 1/2014 | Nakamura | F02D 41/30 123/325 |
| 2018/0100456 A1* | 4/2018 | Yokono | F02B 39/10 |

* cited by examiner

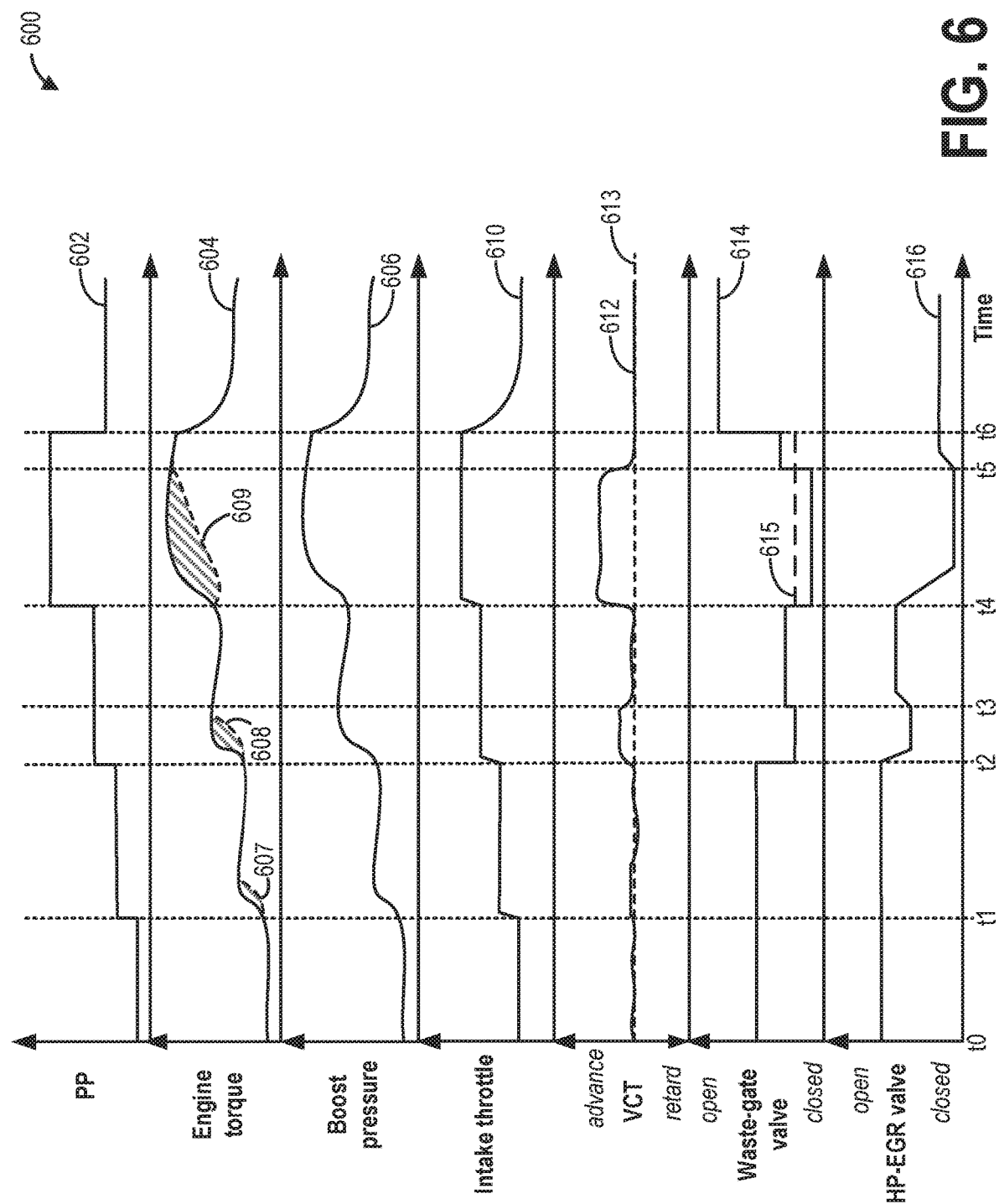

METHODS AND SYSTEM FOR IMPROVING TRANSIENT TORQUE RESPONSE

FIELD

The present description relates generally to methods and systems for providing an improved torque response for a boosted engine.

BACKGROUND/SUMMARY

An engine system may be configured with a boosting device, such as a turbocharger, for providing a boosted air charge to increase torque output. In particular, a turbine is rotated using energy from an exhaust flow. The turbine drives a compressor which delivers a boosted air charge to the engine intake. A boosted engine may offer greater fuel efficiency and lower emissions than a naturally aspirated engine of similar power, enabling a smaller-displacement, turbocharged engine to produce power equivalent to a larger-displacement naturally aspirated engine. An engine system may also be configured with an exhaust gas recirculation (EGR) system wherein at least a portion of the exhaust gas is recirculated to the engine intake. EGR benefits include an increase in engine dilution, decrease in exhaust emissions, and an increase in fuel economy. Operation of the various actuators may be coordinated to improve engine performance.

The benefits of boosting, down-sizing, and introduction of EGR tend to be more pronounced at steady-state conditions. During transient conditions, however, the same actions can hurt fuel economy. As an example, during transient conditions, fuel economy may be forfeited for improved vehicle response. Another reason for the loss in fuel economy is the interaction between the engine response and the actions of the vehicle operator. For example, during a tip-in event, a vehicle response initially falls behind the desired acceleration due to the slower initial build-up of boost. As a result, the operator may perceive a noticeable "dead pedal" zone with no operator observable torque increase. The operator may subsequently overcompensate for this. However, after the initial slower build-up, boost increases at a faster rate due to a positive feedback loop in which higher load and higher air flow lead to more boost pressure. Consequently, the over-compensatory action of the operator may generate excessive air flow and therefore excessive torque increase which in turn requires additional pedal correction by the operator (e.g., tip-out), as well as torque reducing actions (such as spark retard). As a result, the engine may be operated with a lower efficiency than if the initial request had been more closely followed.

One example approach for improving torque response in a boosted engine is shown by Cunningham et al. in U.S. Pat. No. 9,175,629. Therein, during a torque transient, an air intake system (AIS) throttle that draws EGR from a low-pressure exhaust gas recirculation (LP-EGR) system into an intake passage, upstream of a compressor, may be opened to increase a throttle inlet pressure for a downstream throttle, downstream of the compressor. By opening the AIS throttle, airflow may be increased to provide just enough torque without substantially overcompensating the torque demand.

However, the inventors herein have recognized potential issues with such systems. As one example, the increase in throttle inlet pressure may only deliver a part of the load requested during a tip-in transient while the remaining load may still rely on the slower boost build-up. As another example, further lag and increase in response time may be incurred due to the introduction of LP-EGR. In particular, the LP-EGR circuit has a long transport delay, as the exhaust gas must travel through the turbocharger compressor, high pressure air induction plumbing, charge air cooler, and intake manifold before reaching the combustion chamber. Consequently, the actual engine air flow profile may deviate from the desired air flow profile due to variations from the EGR flowing in at different times. As a result, the engine torque response may not track the requested operator torque profile.

In one example, the above issues may be at least partially addressed by a method for a turbocharged engine comprising: in response to an operator torque demand, opening an intake throttle and closing an exhaust waste-gate valve based on the torque demand, independent of a change in exhaust gas recirculation (EGR) and variable cam timing (VCT) schedule; and concurrently scheduling the EGR and VCT based on a predicted load shortfall ratio, independent of an actual position of the intake throttle and the waste-gate valve. In this way, transient torque response can be improved through co-ordination of air-path actuators with the boost system.

As one example, a boosted engine may be configured with a turbocharger including a turbine driving a compressor, exhaust flow bypassing the turbine controlled via an exhaust waste-gate valve. The engine may be configured with high pressure EGR (HP-EGR) capabilities, with exhaust being recirculated from upstream of the turbine to downstream of the compressor. In response to an operator pedal tip-in event, boost actuators including an intake throttle and an exhaust waste-gate valve may be actuated to meet the torque demand. For example, the intake throttle opening may be increased (such as to a wide-open throttle position) to allow more charge air to flow into the intake manifold while the exhaust waste-gate valve opening may be decreased (such as to a fully closed position) to expedite turbine spin-up. The throttle and waste-gate valve positions are scheduled assuming nominal settings of air path actuators, including a high pressure EGR valve and variable cam timing (VCT), even if they are adjusted (as discussed below). As such, if the increased demand can be met without exceeding the throttle authority, EGR and VCT can be maintained at nominal, lower volumetric efficiency settings. Concurrent to the boost adjustment, the engine controller may also predict an anticipated load and/or torque shortfall ratio (aLSR) as a function of the requested engine load (as a function of the pedal position) relative to an estimated engine load that can be provided if the engine continues operating under the current speed-load conditions with no EGR and at wide-open throttle (WOT). In other words, the controller may determine a difference between the requested air charge and air flow versus what can be provided with at WOT with no EGR. If there is a shortfall in the air charge, a torque shortfall will also be expected. As the load shortfall ratio increases, it may be determined that the authority of the fast-acting throttle will be exhausted quickly, and that any remaining torque demand will require more air flow and boost pressure to build further, resulting in a lag. To improve the engine's responsiveness as the load shortfall ratio increases, VCT and HP-EGR may be scheduled based on the shortfall ratio, independent of the actual position of the intake throttle and the exhaust waste-gate valve, in order to pre-empt the shortfall. For example, as the shortfall ratio increases, initially VCT may be maintained at the nominal setting while HP-EGR is limited as a function of the shortfall, enabling more fresh air charge to be delivered to the engine. Then, as the load shortfall ratio increases further, HP-EGR may be limited and VCT may be advanced or retarded to increase the volumetric efficiency as a function of the load shortfall ratio. Likewise, the throttle and waste-gate valve may be actuated independent of the change in HP-EGR and VCT schedule, such as by holding the throttle more open and the waste-gate more closed even as VCT is moved to a higher volumetric efficiency setting. Once the desired boost pressure is achieved, nominal settings for all actuators may be resumed.

In this way, an actual engine torque profile may better track a desired engine torque profile. In particular, engine load and air flow may be delivered during transients while boost is built, and then a smooth transition may be provided out of the transient when sufficient boost has been built. By adjusting fast acting air path actuators including HP-EGR and VCT as a function of a predicted load shortfall ratio, unnecessarily aggressive and fuel inefficient actions that may be required when an intake throttle authority is exhausted are averted. In addition, excessive torque production is averted. By moving the air path actuators just far enough to satisfy the driver demand, the need for fuel inefficient torque buffers is reduced. In addition, when the transient is met, a faster and smoother transition out of the transient condition can be provided more easily. As such, sufficient airflow can be provided to meet the commanded torque increase without overcompensating the commanded torque output and while allowing a smooth and fast transition from transient to steady-state engine operation. Overall, boosted engine performance during transients is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6 shows a graph illustrating example boost actuator adjustments.

DETAILED DESCRIPTION

Figure 1:
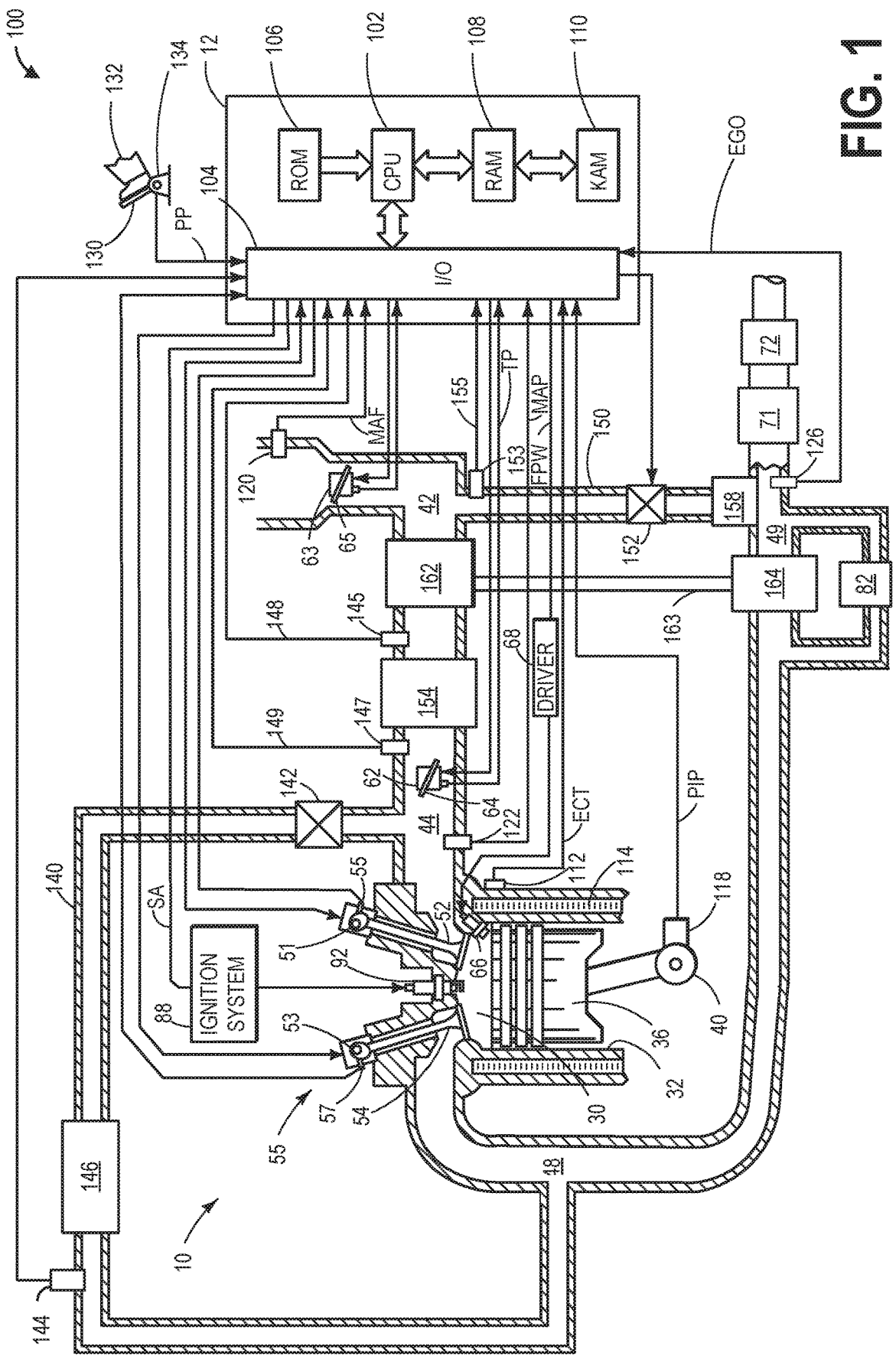
FIG. 1 shows a schematic depiction of an engine system.
Figure 4:
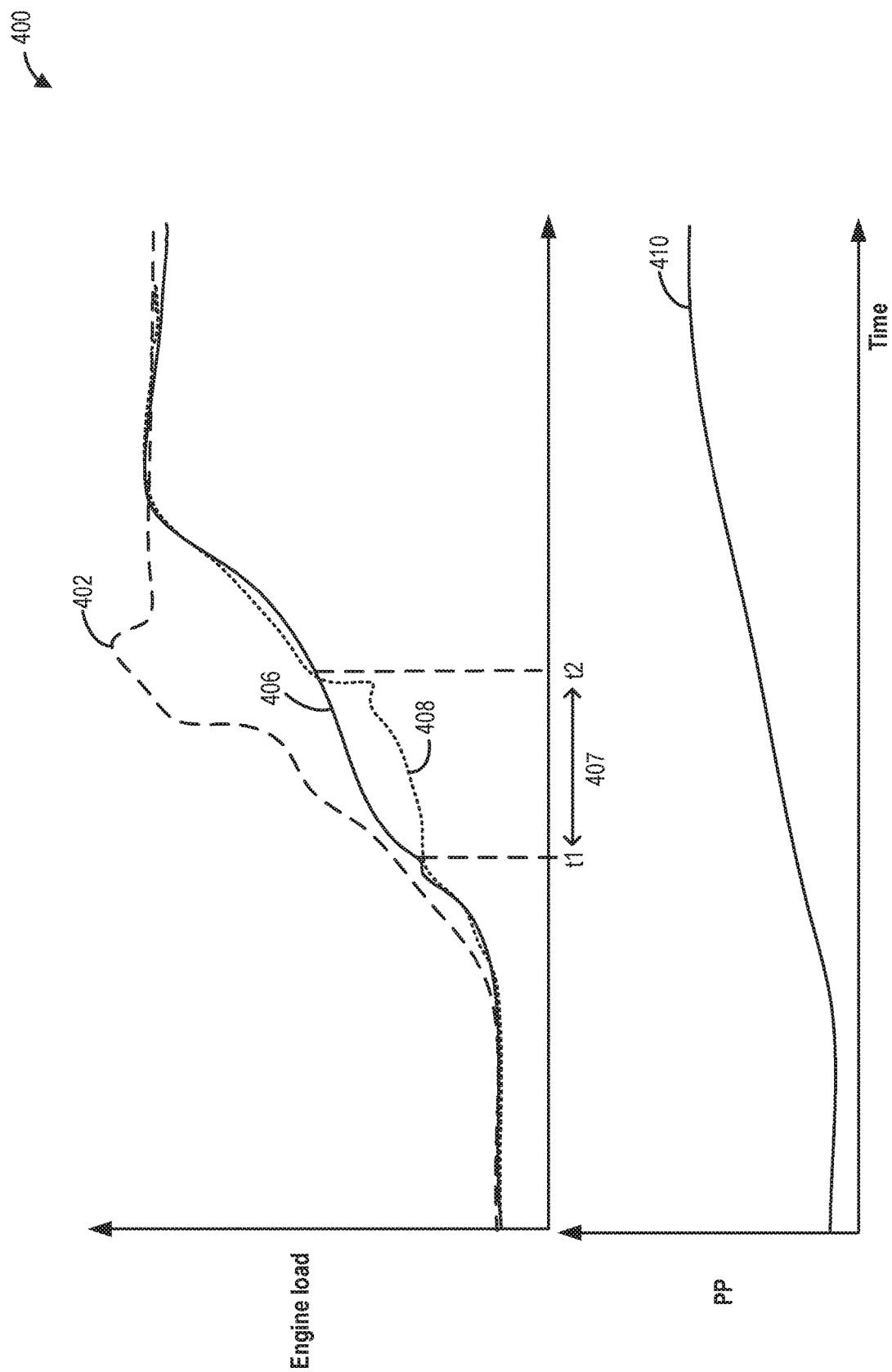
FIG. 4 shows a graph comparing an actual and an anticipatory engine load response responsive to an increase in operator torque demand.
Figure 5:
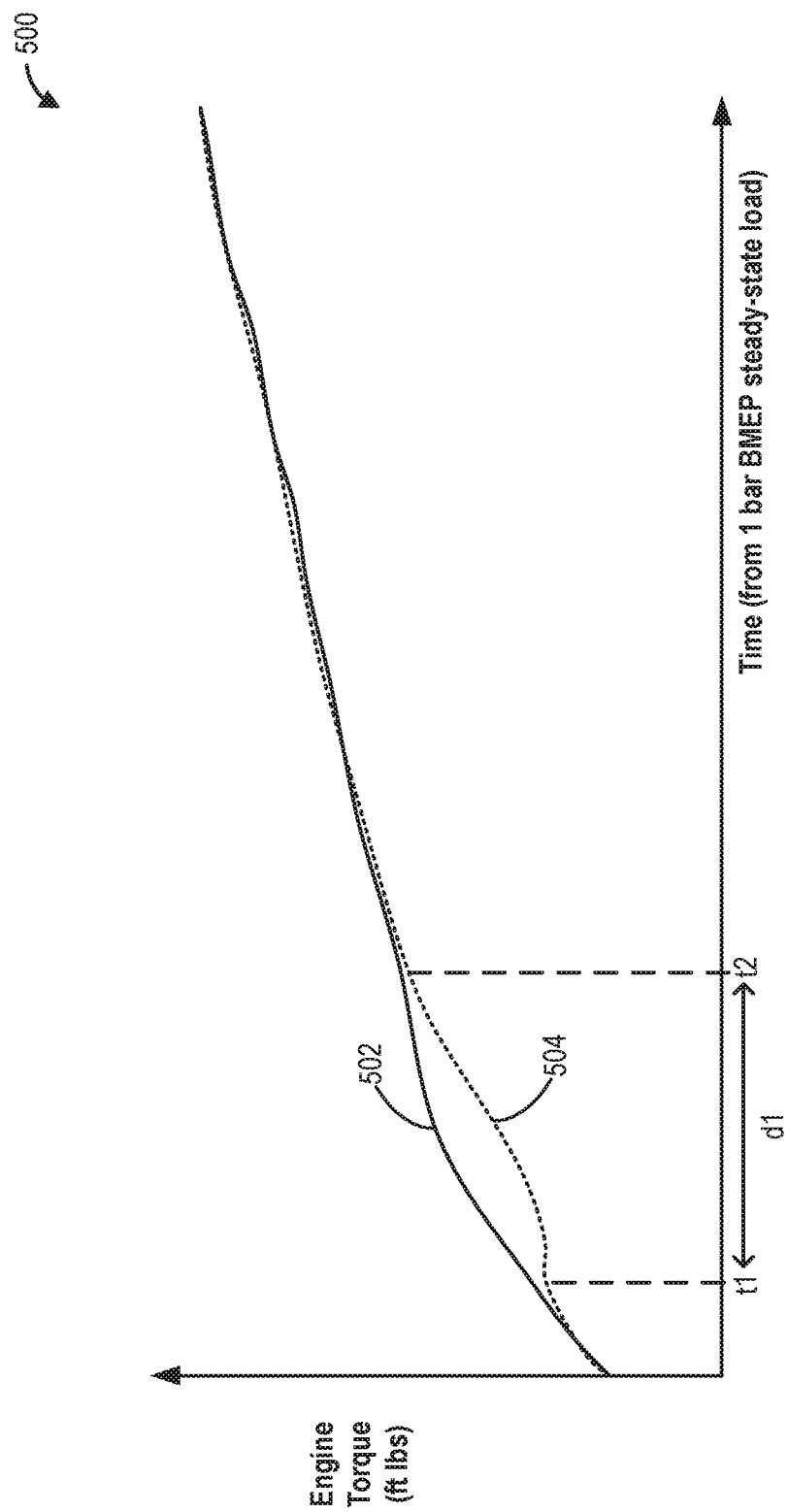
FIG. 5 shows a graph comparing an actual and an anticipatory engine torque response during an increase in operator torque demand.

The following description relates to systems and methods for improving torque response during transient conditions in a boosted engine system, such as engine system of FIG. 1. Responsive to an operator torque demand, a controller may be configured to perform a control routine, such as the example routine of FIG. 2, to adjust air-path actuator settings based on an anticipated load shortfall ratio (FIG. 3), while adjusting boost actuator settings based on the operator torque demand. In particular, the actuator adjustments may be coordinated, but performed independent of each other so that an actual air flow and torque profile can better track a demanded air flow and torque profile. Example engine load (or air flow) and torque responses achieved via the air-path and boost actuator adjustments are illustrated in FIGS. 4 and 5. A prophetic boosted engine operation is shown with reference to FIG. 6. By adjusting air-path actuator settings to compensate for a predicted load or torque shortfall while boost actuator settings are adjusted to increase boost pressure responsive to an increase in operator torque demand, engine torque response can be improved.

Referring now to FIG. 1, it shows a schematic diagram of an engine system 100 comprising one cylinder of multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. Alternatively, the variable valve actuator may be electro hydraulic or any other conceivable mechanism to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT 55.

The VCT 55 may be a twin independent variable camshaft timing system, for changing intake valve timing and exhaust valve timing independently of each other. Further, the VCT 55 may be configured to advance or retard valve timing by advancing or retarding cam timing and may be controlled by controller 12. Further, the VCT 55 may be configured to vary the timing of valve opening and closing events by varying the relationship between the crankshaft position and the camshaft position. For example, VCT 55 may be configured to rotate intake camshaft independently of the crankshaft to cause the valve timing to be advanced or retarded. In some embodiments, VCT 55 may be a cam torque actuated device configured to rapidly vary the cam timing. In some embodiments, valve timing such as intake valve closing (IVC) and exhaust valve closing (EVC) may be varied by a continuously variable valve lift (CVVL) device.

The valve/cam control devices and systems described above may be hydraulically powered, or electrically actuated, or combinations thereof. In one example, a position of the camshaft may be changed via cam phase adjustment of an electrical actuator (e.g., an electrically actuated cam phaser). In another example, the camshaft position may be changed via a hydraulically operated cam phaser. Signal lines can send control signals to and receive a cam timing and/or cam selection measurement from the VCT. By adjusting the variable cam timing, a volumetric efficiency of the engine may be varied. As elaborated herein, VCT may also be adjusted during torque transients to improve boosted engine response.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP. Pressure, temperature, and mass air flow may be measured at various points along intake passage 42 and intake manifold 44. For example, intake passage 42 may include a mass air flow sensor 120 for measuring clean air mass flow entering through throttle 63.

Engine 10 may further include a compression device such as a turbocharger or supercharger including at least a compressor 162 arranged upstream of intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. A charge air cooler 154 may be included downstream from compressor 162 and upstream of intake valve 52. Charge air cooler 154 may be configured to cool gases that have been heated by compression via compressor 162, for example. In one embodiment, charge air cooler 154 may be upstream of throttle 62. Pressure, temperature, and mass air flow may be measured downstream of compressor 162, such as with sensor 145 or 147. The measured results may be communicated to controller 12 from sensors 145 and 147 via signals 148 and 149, respectively. Pressure and temperature may be measured upstream of compressor 162, such as with sensor 153, and communicated to controller 12 via signal 155. The clean air mass flow may be communicated to controller 12 via the MAF signal. Further, a pressure of the air charge within the intake manifold 44 may be sensed and communicate to controller 12 via the manifold air pressure (MAP) sensor. Further, a temperature of the air charger within intake manifold 44 may be measured by manifold air temperature (MAT) sensor and communicated to controller 12. Further, a pressure of compressed air upstream of intake throttle 63 and downstream of compressor 162 may be sensed by throttle inlet pressure (TIP) sensor, such as sensor 145. Specifically, boost levels in engine system may be measured by TIP sensor via measuring TIP (also termed, boost pressure).

Further, in the disclosed embodiments, an EGR system may route a desired portion of exhaust gas from exhaust passage 48 to intake manifold 44. FIG. 1 shows an HP-EGR system and an LP-EGR system. The HP-EGR is routed through HP-EGR passage 140 from upstream of turbine 164 (also termed as exhaust turbine) to downstream of compressor 162. The amount of HP-EGR provided to intake manifold 44 may be varied by controller 12 via HP-EGR valve 142. The LP-EGR is routed through LP-EGR passage 150 from downstream of turbine 164 to upstream of compressor 162. The amount of LP-EGR provided to intake manifold 44 may be varied by controller 12 via LP-EGR valve 152. The HP-EGR system may include HP-EGR cooler 146 and the LP-EGR system may include LP-EGR cooler 158 to reject heat from the EGR gases to engine coolant, for example.

Under some conditions, the EGR system may be used to regulate the temperature of the air and fuel mixture within combustion chamber 30. Thus, it may be desirable to measure or estimate the EGR mass flow. EGR sensors may be arranged within EGR passages and may provide an indication of one or more of mass flow, pressure, temperature, concentration of $O_2$, and concentration of the exhaust gas. For example, an HP-EGR sensor 144 may be arranged within HP-EGR passage 140. As elaborated herein, an amount of HP-EGR may also be adjusted during torque transients to improve boosted engine response.

Exhaust gases exiting combustion chambers 30 and exhaust passage 48 spin exhaust turbine 164 which is coupled to compressor 162 along shaft 163. The amount of compression provided to one or more cylinders of the engine via turbocharger may be varied by controller 12. When reduced turbine torque is desired, some exhaust flow may be directed through a waste-gate 82 bypassing the turbine. The waste-gate 82 (also termed, exhaust waste-gate) may be coupled across exhaust turbine 164 in turbocharger. By adjusting a position of waste-gate 82 via controller 12, an amount of boost provided by the turbocharger may be controlled. Thus, the waste-gate 82 may be a boost actuator. Herein, controller 12 may provide a signal based on the desired boost to adjust an electromechanical actuator coupled to waste-gate 82. The combined flow from the turbine 164 and the waste-gate 82 may then flow through emission control device 71 and 72.

Depending on operating conditions, a portion of exhaust gases may be recirculated from the exhaust passage 49, downstream of turbine 164, to intake passage 42, upstream of compressor 162 via exhaust gas recirculation (EGR) passage 150. The portion of exhaust gases may flow through EGR passage 150 via EGR cooler 158 and LP-EGR valve 152. In this manner, low pressure EGR (LP-EGR) may be enabled. In some embodiments, instead of or in addition to the LP-EGR, high pressure EGR (HP-EGR) may also be enabled wherein a portion of exhaust is recirculated from the exhaust passage 48, from upstream of turbine 164, to intake manifold 44, downstream of compressor 162 via a distinct and separate high pressure EGR passage 140 and therein coupled EGR cooler 146 and HP-EGR valve 142. LP-EGR valve 152 and HP-EGR valve 142 may be opened (e.g., an opening of the EGR valves may be increased) to admit a controlled amount of cooled exhaust gas to the intake passage for desirable combustion and emissions-control performance. As such, LP-EGR valve 152 and HP-EGR valve 142 may be actuated by an actuator (e.g., electric, mechanical, hydraulic, etc.) based on commands received from controller 12.

Each cylinder 30 may be serviced by one or more valves. In the present example, each cylinder 30 includes a corresponding intake valve 52 and an exhaust valve 54. Each intake valve 52 and exhaust valve 54 may be held at a desired position via a corresponding spring. Engine system 100 further includes one or more camshafts (not shown) for operating intake valve 52 and/or for operating exhaust valve 54. In one example, intake camshaft may be coupled to intake valve 52 and can be actuated to operate intake valve 52. In another example, exhaust camshaft may be coupled to exhaust valve 54 and can be actuated to operate exhaust valve 54. In some embodiments, where the intake valve of a plurality of cylinders 30 are coupled to a common camshaft, intake camshaft may be actuated to operate the intake valves of all the coupled cylinders.

Intake valve 52 is actuatable between an open position that allows intake air into the corresponding cylinder and a closed position substantially blocking intake air from the cylinder. Intake camshaft (not shown) may be included in intake valve actuation system which is in communication with controller 12. Intake camshaft may include an intake cam which has a cam lobe profile for opening intake valve 52 for a defined intake duration. In some embodiments (not shown), the camshaft may include additional intake cams with an alternate cam lobe profile that allows the intake valve 52 to be opened for an alternate duration (herein also referred to as a cam profile switching system). Based on the lobe profile of the additional cam, the alternate duration may be longer or shorter than the defined intake duration of intake cam. The lobe profile may affect cam lift height, cam duration, and/or cam timing. In one example, intake camshaft is shifted to a more advanced timing. By opening the intake valve earlier, burned gas back is allowed to flow into the intake port, thereby displacing the air that would have been ingested during a subsequent intake stroke. In another example, when intake camshaft is shifted to a more retarded timing, the intake valve may be opened later. As a result, the intake valve is closed well into the compression stroke, resulting in the cylinder air being pushed back into the intake port with less air being retained in the cylinder. A controller may be able to switch the intake valve duration by moving intake camshaft 68 longitudinally and switching between cam profiles.

In the same manner, each exhaust valve 54 is actuatable between an open position allowing exhaust gas out of the corresponding cylinder and a closed position substantially retaining gas within the cylinder and blocking the exit of exhaust gases from the cylinder. As such, early exhaust valve opening may have limited impact on air charge. Exhaust camshaft (not shown) may be included in exhaust valve actuation system which is in communication with controller 12. Exhaust camshaft may include an exhaust cam which has a cam lobe profile for opening exhaust valve 54 for a defined exhaust duration. In some embodiments, where the exhaust valve of a plurality of cylinders 30 is coupled to a common camshaft, the exhaust camshaft can be actuated to operate the exhaust valves of all the coupled cylinders. In some embodiments, the exhaust camshaft may further include additional exhaust cams with an alternate cam lobe profile that allows exhaust valve 54 to be opened for an alternate duration. The lobe profile may affect cam lift height, cam duration, and/or cam timing. In one example, when the exhaust camshaft is shifted to a more retarded timing, the exhaust valve may be opened later, allowing burned gas to flow back into the port due to increased overlap with intake valve opening, and thereby displacing the air that will be ingested during subsequent intake stroke. In another example, when the exhaust camshaft is shifted to a more advanced timing, then exhaust valve may be opened earlier with minimal impact on the air charge. A controller may be able to switch the exhaust valve duration by moving the exhaust camshaft longitudinally and switching between cam profiles.

Intake valve actuation system and exhaust valve actuation system may further include push rods, rocker arms, tappets, etc. Such devices and features may control actuation of the intake valve 52 and the exhaust valve 54 by converting rotational motion of the cams into translational motion of the valves. As previously discussed, the valves can also be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 30 may each have more than one exhaust valve and/or intake valve. In still other examples, each of the exhaust valve 54 and intake valve 52 of one or more cylinders may be actuated by a common camshaft. Further still, in some examples, some of the intake valves 52 and/or exhaust valves 64 may be actuated by their own independent camshaft or other device.

Exhaust gas sensor 126 is shown coupled to exhaust passage 48 downstream of turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor.

Emission control devices 71 and 72 are shown arranged along exhaust passage 48 downstream of exhaust gas sensor 126. Devices 71 and 72 may be a, three way catalyst (TWC), $NO_x$ trap, various other emission control devices, or combinations thereof. For example, device 71 may be a TWC and device 72 may be a particulate filter (PF). In some embodiments, PF 72 may be located downstream of TWC 71 (as shown in FIG. 1), while in other embodiments, PF 72 may be positioned upstream of TWC 72 (not shown in FIG. 1).

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; boost pressure from a throttle inlet pressure (TIP) sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Based on the signals received from the various sensors of FIG. 1, and instructions stored on a memory of the controller, controller 12 employs the various actuators of FIG. 1 to adjust engine operation. For example, controller 12 may send signals to actuate throttle 64, LP-EGR valve 152, HP-EGR valve 142, VCT actuator, intake and exhaust valves, waste-gate valve 82, etc. As an example, controller 12 may be configured to send a signal to an actuator coupled to each of the intake throttle and the exhaust waste-gate valve responsive to an increase in operator torque demand to move the throttle to a more open position while moving the waste-gate valve to a more closed position, independent of a change in EGR and VCT schedule. As another example, controller 12 may send a signal to vary a schedule of the HP-EGR valve and the VCT actuator to limit the amount of EGR while increasing the volumetric efficiency of the engine responsive to the increase in torque demand, the schedules varied independent of the commanded change in position of the intake throttle and the waste-gate valve.

Figure 2:
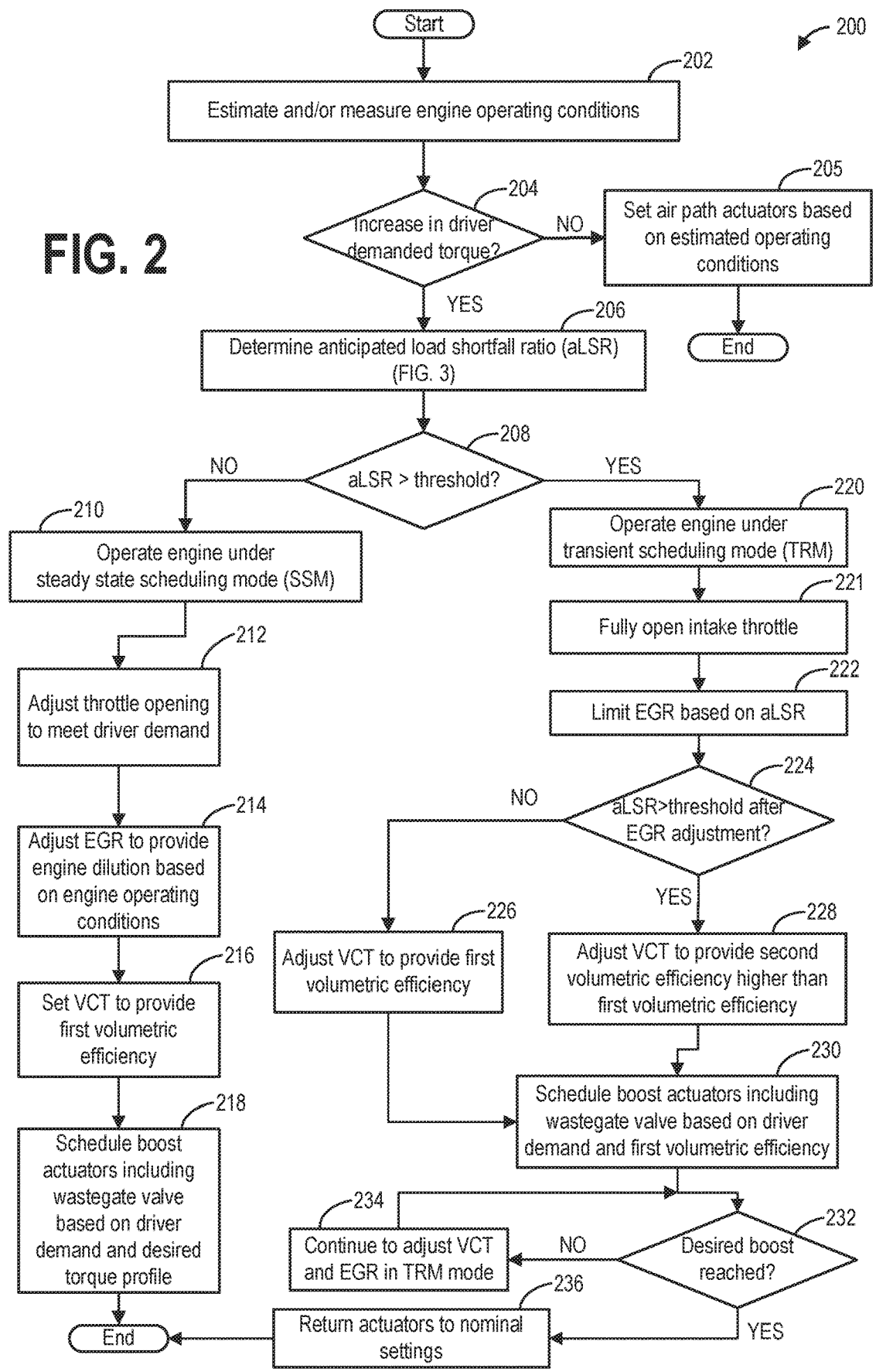
FIG. 2 is an example flowchart illustrating a high level routine for providing a transient torque response responsive to an increase in operator torque demand.
Figure 3:
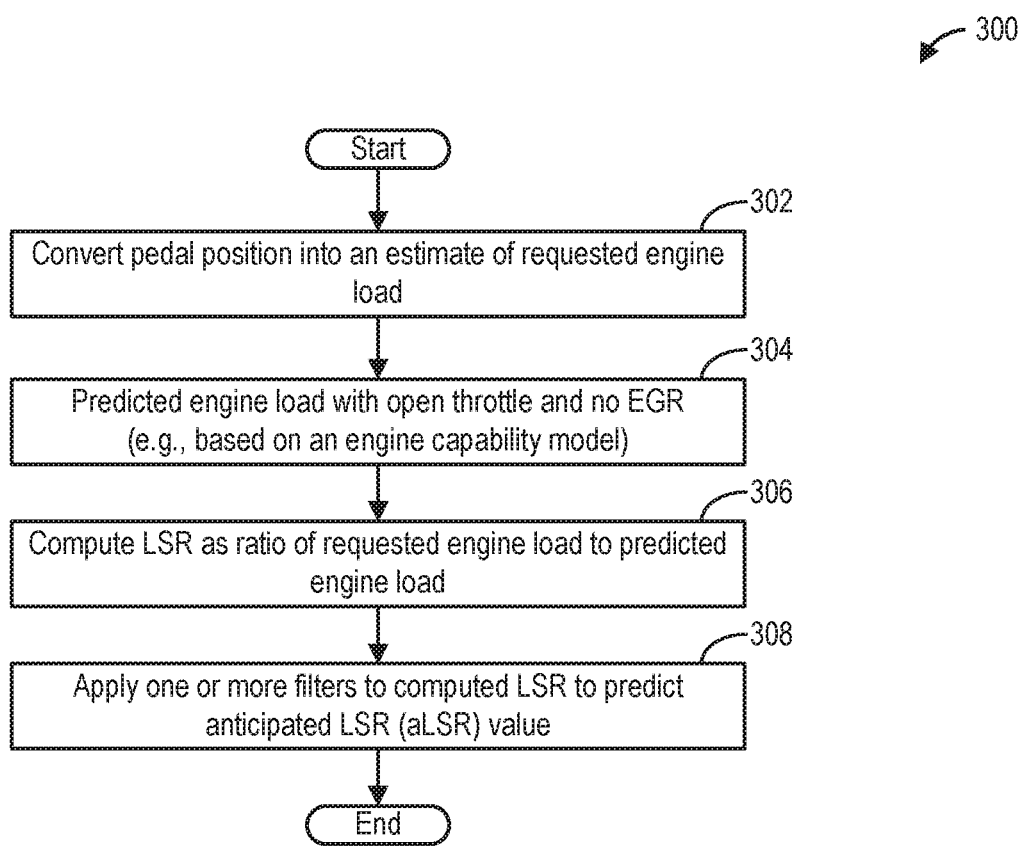
FIG. 3 is a flowchart illustrating an example method for computing an anticipated load shortfall ratio based on an estimate of requested and predicted engine load.

For example, controller 12 may be configured to identify an anticipated load shortfall (aLSR), as elaborated in FIG. 3, based on a transient increase in operator torque demand, and in response to the transient increase in torque, the controller may adjust the air path actuators accordingly, as elaborated in FIG. 2. The load shortfall ratio (LSR), as used herein, is defined as the ratio between current engine torque output and predicted engine torque output with wide-open throttle and no EGR. Example routines that may be used to adjust the air-path actuators based on an anticipated LSR are described at FIGS. 2-3.

In this way, the components of FIG. 1 enables an engine system comprising an accelerator pedal for receiving an operator torque demand; an engine including an intake manifold; a turbocharger including an intake compressor, driven by an exhaust turbine, for providing a boosted air-charge to the engine; an intake throttle coupled to the intake manifold, downstream of the intake compressor; a waste-gate, including a waste-gate valve, coupled across the exhaust turbine; an exhaust gas recirculation (EGR) system including a high pressure EGR passage including an EGR valve for recirculating exhaust from upstream of the exhaust turbine to downstream of the intake compressor; a variable cam timing (VCT). The engine system may further comprise a controller with computer readable instructions stored on non-transitory memory for: responsive to an increase in operator torque demand, received while operating with at least some EGR and with the VCT at a first schedule, reducing an opening of the EGR valve while transitioning the VCT to a second schedule having a higher volumetric efficiency than the first schedule; increasing an opening of the throttle while decreasing an opening of the waste-gate valve, the increasing and decreasing based on the first schedule of the VCT. In one example, reducing an opening of the EGR valve may be based on a ratio between desired engine output corresponding to the increased operator torque demand and predicted engine output at wide open throttle, with the EGR valve fully closed and VCT at the first schedule. In a further example, the increasing and decreasing may be based on the first schedule of the VCT including, responsive to the operator torque demand, holding the waste-gate valve more closed based on a lower volumetric efficiency of the first schedule, even as the VCT is transitioned to the higher volumetric efficiency of the second schedule. The controller may include further instructions for: responsive to the operator torque demand being met, increasing the opening of the EGR valve while returning the VCT to the first schedule; decreasing an opening of the throttle while increasing an opening of the waste-gate valve, each of the increasing and decreasing based on the first schedule of the VCT. In still further examples, the EGR system further includes a low pressure EGR passage including another EGR valve for recirculating exhaust from downstream of the exhaust turbine to upstream of the intake compressor, and wherein the controller includes further instructions for adjusting an opening of the another EGR valve responsive to each of the operator torque demand and the reducing an opening of the EGR valve.

Referring now to FIG. 2, an example routine is shown for improving a transient torque response of a boosted engine following an operator request for increased torque. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the method includes estimating engine operating conditions, such as engine speed, pedal position, operator torque demand, engine torque output, exhaust temperature, engine dilution, turbine speed, intake manifold pressure (MAP) and manifold air flow (MAF), boost pressure, etc. At 204, it may be determined whether there is an increase in the driver demanded torque. In one example, an increase in driver torque demand may be confirmed responsive to an operator pedal tip-in resulting in a displacement of the accelerator pedal. If there is an increase in driver demanded torque, then the method continues to 206. Otherwise, the method moves to 205, wherein the air-path actuators are maintained at their nominal settings and/or continued to be set based on the estimated operating conditions. For example, the controller may continue operating the engine in a steady state scheduling mode (SSM) wherein VCT is placed at nominal settings corresponding to a lower volumetric efficiency, wherein HP-EGR is adjusted to provide an engine dilution based on engine speed-load conditions, and wherein the intake throttle and the waste-gate valve are also actuated based on engine speed-load conditions. Then the method ends.

At 206, upon confirming an increase in driver demanded torque, an anticipated load shortfall ratio (aLSR) is determined. As elaborated at FIG. 3, the shortfall ratio predicts an anticipated shortfall in air charge or air flow, and thereby an engine torque shortfall between the driver request and the engine's capability while accounting for varying engine conditions (such as ambient pressure, manifold temperature, fuel alcohol content, etc.) that affect the capability of the engine. Engine air path actuators are then adjusted based on the shortfall so that a faster and smoother transition to the desired boost pressure can be better provided. Once the aLSR is determined, the method proceeds to 208.

At 208, the determined load shortfall ratio is compared to a threshold and it is determined whether the aLSR is greater than the threshold. In one example, the threshold may be set as a function of the engine load or air charge amount required to operate the engine with wide-open-throttle (WOT) and no EGR conditions. For example, the threshold may be set to 1.0 corresponding to the maximum authority of the throttle for providing a fast response. If the load shortfall ratio exceeds the threshold, it may be inferred that any additional torque request may require boost to build, causing a delay in torque output of the engine. For example, once the threshold is exceeded, further boost pressure may require the exhaust turbine and the intake compressor to spin-up, resulting in a turbo lag which can adversely affect engine performance, and cause the operator to perceive a sluggish vehicle response.

If the aLSR is below the threshold, then at 210, the engine controller may be configured to continue operating the engine according to the steady state scheduling mode (SSM). In one example, the SSM may include operating the engine with a nominal schedule for VCT and EGR that is typically obtained by steady-state engine mapping to provide best fuel economy, with constraints on combustion stability and emissions. For example, the mapping may estimate engine BSFC and identify EGR and VCT schedules that provide the lowest BSFC for a given engine operating condition. As such, operating in the SSM mode may improve fuel economy during mild driving. Operating in the SSM includes, at 212, adjusting intake throttle opening responsive to the driver demanded torque. In one example, as the demanded torque increases, the opening of the intake throttle may be increased. In another example, the opening of the intake throttle may be based on the current manifold pressure or boost pressure relative to a target boost pressure based on the driver demanded torque, the opening of the intake throttle increased as a difference between the current boost pressure and the target boost pressure increases.

Further, at 214, the controller may adjust an opening of an EGR valve to provide a desired engine dilution, the engine dilution determined based on engine speed-load conditions. As an example, higher engine dilution may be requested at low-mid engine speed-load conditions while lower engine dilution may be requested at mid-high speed-load conditions. The controller may adjust the opening of an HP-EGR valve to provide the desired engine dilution by recirculating exhaust from upstream of a turbine to downstream of a compressor. In another example, responsive to the operator torque demand, while operating in the SSM mode, the controller may close the HP-EGR valve or maintain the EGR valve closed, if already closed. By closing the EGR valve, air charge dilution may be reduced and, thus boost pressure required to achieve the desired torque output may be attained quickly without the need to provide a transient torque response. In addition, the controller may close a LP-EGR valve recirculating exhaust from downstream of the turbine to upstream of the compressor. In other examples, a degree of opening of the HP-EGR valve may be coordinated with the degree of opening of the LP-EGR valve to provide the desired engine dilution.

Operating in the SSM mode further includes, at 216, scheduling VCT to provide a first lower volumetric efficiency. In this way, the air path actuators (VCT and EGR) may be adjusted to provide sufficient airflow into the intake manifold to achieve the desired torque output.

At 218, operating in the SSM mode further includes the controller scheduling boost actuators, including a waste-gate valve coupled in a waste-gate across the exhaust turbine, based on the driver demand and the desired torque profile (or desired air charge profile). In one example, as the demanded torque increases (or as the demanded air charge amount increases), the opening of the waste-gate valve may be decreased. In another example, the opening of the waste-gate valve may be based on the current manifold pressure or boost pressure relative to a target boost pressure based on the driver demanded torque, the opening of the waste-gate valve decreased as a difference between the current boost pressure and the target boost pressure increases.

In contrast, if the aLSR (determined at step 206) is greater than the threshold, then at 220, the engine controller may be configured to operate the engine according to a transient scheduling mode (TRM). In one example, the TRM may be enabled for delivering desired load during transients, in anticipation of turbo lag, such as during a sudden increase in operator torque demand following a large pedal tip-in.

In response to the sudden increase in torque demand, at 221, the intake throttle opening may be adjusted to a more open position (e.g., fully opened to wide-open throttle position, WOT) to allow more pressurized air charge into the intake manifold to expedite an increase in boost pressure and torque output. It will be appreciated that the intake throttle may be scheduled independent of the HP-EGR and VCT schedules and while assuming the lower volumetric efficiency setting of the SSM mode.

The inventors have recognized that during a tip-in transient where the driver asks for increased load, the demand can be satisfied quickly if it does not exceed the throttle authority. In other words, if opening the throttle is enough to meet the increase air flow demand, there is no immediate need to do anything else. On the other hand, if the throttle authority is exhausted, as determined based on the aLSR, there is an opportunity to move air-path actuators such as for VCT and EGR that are faster than the turbocharger for improved response (and for faster delivery of the demanded increased air flow). This is achieved by enabling the TRM. Once TRM is enabled, the boost actuators may be coordinated with air path actuators so that the engine can be returned to the SSM mode quickly and smoothly as to maximize fuel economy without inducing any drivability concerns.

At 222, operating in the TRM includes limiting EGR as a function of aLSR. For example, the EGR (e.g. HP-EGR) valve may be adjusted to be less open based on aLSR in order to reduce engine dilution. In one example, EGR is limited proportional to a function defined by (1-aLSR). In an alternate function, EGR is limited proportional to a difference between aLSR and the threshold. The controller may use a map, look-up table, algorithm, or other function that uses the calculated aLSR (as calculated according to the method described at FIG. 3) as an input and provides a target HP-EGR valve position as an output. In one example, limiting HP-EGR proportional to the shortfall ratio includes fully closing the HP-EGR valve. By reducing HP-EGR, the portion of the intake manifold that is filled with fresh air is increased, which along with the increase in throttle opening, increases engine torque output. This, in turn, leads to faster acceleration of the turbine spin-up for providing elevated engine torque as well as higher-enthalpy exhaust gas leaving the cylinder, feeding the turbine, and driving the compressor. In some examples, LP-EGR may be additionally adjusted based on the HP-EGR scheduling, such as to a less open position, to further reduce engine dilution. It will be appreciated that the EGR may be scheduled while maintaining the VCT schedule and while assuming the lower volumetric efficiency if the SSM mode. In addition, the HP-EGR may be scheduled independent of the adjustment to the throttle and the waste-gate valve. This allows EGR to be scheduled just far enough as is necessary to satisfy driver demand, reducing the need for unnecessarily aggressive and potentially fuel inefficient actions.

Once EGR has been adjusted based on aLSR, at 224, the method includes again determining whether the aLSR is still above a threshold. That is, it may be determined if a torque or load shortfall is predicted after the throttle authority is exhausted and after HP-EGR is limited. If the updated aLSR value drops below the threshold, it may be inferred that the increase in operator torque demand can be satisfied by adjusting HP-EGR alone and further air path actuator adjustments are not required. Accordingly, at 226, VCT may be maintained at a nominal schedule corresponding to a lower volumetric efficiency setting. If the updated aLSR value is above the threshold, it may be inferred that further air-path actuators adjustments, such as VCT adjustments, are needed to satisfy the torque demand and reduce the possibility of a future torque shortfall.

If aLSR is greater than a threshold after EGR adjustment, then the method proceeds to 228, where VCT is transitioned to a schedule that provide a second volumetric efficiency, higher than the first volumetric efficiency. In one example, VCT may be advanced or retarded from the first lower volumetric efficiency to the second higher volumetric efficiency schedule. While the lower volumetric efficiency schedule is more efficient for steady driving, the response to a transient driver demand may be improved by transitioning to the higher volumetric efficiency schedule. For example, the timing of intake valve opening may be advanced in the second schedule with respect to the first schedule in order to provide an increased volumetric efficiency. The amount of advance in this example may be chosen to offset the shortfall indicated by aLSR.

At 230, boost actuators, including the exhaust waste-gate valve may be scheduled based on the driver demand. For example, the exhaust waste-gate valve opening may be decreased, such as to a fully closed position to expedite turbine spin-up. It will be appreciated that the waste-gate valve may be scheduled independent of the HP-EGR and VCT schedules and while assuming the lower volumetric efficiency setting of the SSM mode. By adjusting the waste-gate valve to a more closed position, exhaust flow through turbine is increased, reducing turbo lag and improving delivery of the demanded boost pressure. By scheduling the waste-gate valve independent of a change in EGR and VCT schedules, the boost actuators may be positioned to bring boost pressure to a level that is necessary to smoothly transition back to, and sustain, boost pressure in the SSM schedule once the torque (or air flow) demand is met. In one example, scheduling the waste-gate valve independent of the change in EGR and VCT schedules results in the waste-gate valve remaining more closed and/or closed for a longer duration, as compared to a waste-gate position based on the VCT position (corresponding to a higher volumetric efficiency) and EGR level (e.g., the more limited EGR level) during the transient mode, to enable a faster turbine-spin up and quicker turbocharger response.

At 232, it is determined whether the desired/target boost pressure has been reached. If the desired boost pressure, corresponding to the operator torque demand, has been reached, then the method proceeds to 236, where the air-path actuators are returned to their nominal settings. For example, HP-EGR may be scheduled according to the engine speed-load to increase engine dilution, such as by increasing the opening of the HP-EGR valve (and the LP-EGR valve in coordination with the HP-EGR valve). In addition, VCT may be returned (e.g., advanced or retarded) back to a nominal setting corresponding to a lower volumetric efficiency. If the target boost pressure is not reached, the method returns to 234, where the VCT and EGR are continued to be adjusted under the TRM mode, with the HP-EGR being further limited, and the VCT transitioned to a setting that further increases volumetric efficiency.

It will be appreciated that while the method shows adjusting the actuators responsive to the predicted load or airflow shortfall ratio, in alternate examples, the actuators may be adjusted responsive to a predicted torque shortfall ratio calculated based on the load or airflow shortfall ratio.

In this way, the transient torque response may be improved during an increase in operator torque demand. By opening an intake throttle and closing an exhaust waste-gate valve based on the torque demand, independent of a change in EGR and VCT, and concurrently scheduling the EGR and VCT based on a load or torque shortfall ratio, independent of an actual position of the intake throttle and the waste-gate valve, torque overcompensation and potential fuel inefficient actions may be avoided. Further, an actual torque response provided may more closely track a desired torque response, reducing the need for a torque or air buffer.

Further, by concurrently scheduling EGR and VCT based on the predicted load or torque shortfall ratio, EGR scheduling may be limited while maintaining VCT at a lower volumetric efficiency when the predicted shortfall ratio is lower than a threshold. Further still, if the shortfall ratio is higher than a threshold, VCT may be transitioned from a lower volumetric efficiency to a higher volumetric efficiency.

Referring now to FIG. 3, an example routine to determine aLSR is presented. By predicting aLSR, a load or torque shortfall may be anticipated which allows the engine controller to provide a more robust engine torque response in situations where an increase in torque demand is requested by an operator. It will be appreciated that method 300 depicts one example routine for calculating aLSR and that other routines, maps, look-up tables, and algorithms may be used by the controller to estimate aLSR without departing from the scope of the disclosure.

At 302, an accelerator pedal position may be translated into an estimate of requested engine load. In one example, the requested engine load may be determined from a look-up table indexed based on engine load in correlation with various combinations of accelerator pedal position range. In another example, the method may read the current pedal position depression (PP) from a sensor (such as PP sensor 134 of FIG. 1), relative to closed pedal and wide open pedal positions as reference, and calculate the engine load based on a determined relationship between pedal depression and a desired engine load. Once the requested engine load for a given pedal position is determined, the method proceeds to 304.

At 304, an engine load that can be delivered based on the engine's capability is predicted. In particular, the predicted engine load is calculated assuming the engine is operating with a fully-open throttle (e.g., at WOT) and with no EGR being delivered, such as by using an engine capability model. In one example, engine loads possible at different engine speeds with no EGR and WOT may be previously mapped (e.g., during engine calibration) and stored in the controller's memory, and may be retrieved by the controller to predict the engine load. In one example, the predicted engine load may be mapped from a predetermined relationship between throttle position, air mass flow, and engine load. Once the predicted engine load with wide-open throttle and no EGR is determined, the method proceeds to 306.

At 306, a load shortfall ratio (LSR) is computed as a ratio of requested engine load to predicted engine load. In one example, a load shortfall ratio of 1 represents the maximum torque output which may be provided by wide-open throttle conditions, and any additional torque request above LSR=1 may require boost build-up. For example, when the ratio is 1, it may be predicted that the authority of the fast acting throttle will be exhausted and any additional torque request will require boost to build, which is a slower process, resulting in torque lag. By anticipating the future value of LSR, and adjusting air path actuators accordingly, the responsiveness of the engine is further improved. In one example, the engine may be operated in the SSM mode when LSR is below 1 and in the TRM mode when LSR is greater than 1. Once the LSR value is determined, the method proceeds to 308.

At 308, one or more lead filters are applied to the computed LSR in order to predict an anticipated LSR value. In one example, aLSR may be predicted through the use of one or more of lead filtering and prediction and preview information. In one example, a lead filter may be implemented by the following equations:

$$X(k) = (1-f)*X(k-1) + f*LSR(k)$$

$$aLSR(k) = (1-r)*X(k) + r*LSR(k)$$

where k is time index, X(k) is an auxiliary variable, and (f, r) are appropriately chosen parameters. Furthermore, one or more of driver operating history, navigational input including road and traffic conditions, and vehicle data may be incorporated into the filtering system in order to improve the accuracy of aLSR prediction. For example, the parameters (f, r) may be adjusted in response to the history of the driving style and the current traffic conditions. In this example, the parameters may be increased for more dynamic driving and traffic conditions in order to provide more intervention by the system and increased torque responsiveness. In another example, the aLSR may be increased in response to preview information, such as impending take over maneuvers or road grade increases, in order to effectively increase the buffer of torque that is quickly available.

In this way, in response to an operator torque demand, an engine controller of a turbocharged engine may open an intake throttle and close an exhaust waste-gate valve based on the torque demand, independent of a change in exhaust gas recirculation (EGR) and variable cam timing (VCT) schedule. As a result, an engine may be transitioned from nominal conditions of a steady-state mode of operation to a transient response mode that enables torque responsiveness to be improved and desired torque profile to be better tracked. Concurrently, the controller may schedule the EGR and VCT based on a predicted torque shortfall ratio, independent of an actual position of the intake throttle and the waste-gate valve. Further, the controller may estimate a predicted torque shortfall based on a difference between a current engine torque output and a predicted engine torque output with wide-open throttle and no EGR, and then calculate the predicted torque shortfall based on the predicted torque shortfall relative to the operator torque demand. Additionally, the predicted torque shortfall ratio may be further based on one or more of driver operating history, navigational input including road and traffic conditions, and vehicle data. In one example, opening the intake throttle and closing the waste-gate valve based on the torque demand may include estimating a target boost pressure based on the torque demand, and increasing the opening of the intake throttle while increasing the closing of the waste-gate valve as the target boost pressure increases. In another example, concurrently scheduling EGR and VCT based on the predicted torque shortfall ratio may include limiting EGR while maintaining VCT at a first schedule when the predicted torque shortfall ratio is lower than a threshold, and limiting EGR while transitioning VCT from the first schedule to a second schedule when the predicted torque shortfall ratio is higher than the threshold, the first schedule having a lower volumetric efficiency than the second schedule. As used herein, in one example, transitioning VCT from the first schedule to the second schedule includes advancing or retarding VCT from the lower volumetric efficiency to the higher volumetric efficiency. Opening the intake throttle and closing the exhaust waste-gate valve independent of a change in the VCT schedule may include adjusting a degree of opening of the intake throttle and a degree of closing of the waste-gate valve based on the lower volumetric efficiency of the first VCT schedule. The turbocharged engine may include an exhaust turbine driving an intake compressor, the waste-gate valve coupled to the exhaust turbine, wherein the EGR is a high pressure EGR (HP-EGR) including exhaust gas recirculated from upstream of the exhaust turbine to downstream of the intake compressor. The controller may be further configured to adjust a low pressure EGR schedule based on the limiting of the HP-EGR, the lower pressure EGR including exhaust gas recirculated from downstream of the exhaust turbine to upstream of the intake compressor. In response to the target boost pressure being reached, the controller may return VCT to the first schedule with the lower volumetric efficiency and increase EGR. As a result, nominal conditions of a steady-state mode of operation may be resumed.

In this way, the engine controller may accurately schedule different engine operating modes depending on the predicted aLSR values. In doing so, the boosted engine may be able to provide the torque output necessary to sustain the SSM mode, while providing a fast and smooth transition from TRM to SSM mode.

Turning now to FIG. 4, a graph comparing a baseline engine load response to an engine load response based on the anticipated torque shortfall approach of FIG. 2 (herein also referred to as an anticipatory engine load response) following an increase in operator torque demand is shown. Map 400 depicts an example of actual and anticipatory engine load of a gasoline turbocharged direct injection (GTDI)

engine under increasing pedal position along the y-axes. The increase in pedal position, shown on plot 410, is indicative of an operator torque demand, with the torque demand increasing as the pedal is depressed further. All plots are depicted over time along the x-axis. In one example, the engine is a 2.0L GTDI engine and the response for the engine during pedal crowd from 45 mph. Plot 402 shows the demanded engine load, which is increased in response to the increase in pedal position, shown on plot 410. Plot 408 shows the baseline engine load response and plot 406 shows the anticipatory engine load response. As used herein, load refers to the normalized cylinder air charge. It will be appreciated that the load of plot 408 may also be considered indicative of air charge or air mass. By comparing plot 408 and plot 406, it is determined that the anticipatory engine load response 406 is overall closer to the desired engine load during the maneuver. In particular, it is seen that the initial time with small shortfall is significantly extended, which indicates a perceivably better connectedness between demand and request. The anticipatory engine response 406 is improved because the shortfall (shown at duration 407, between t1 and t2) between the demand and the request is recognized earlier, which leads to earlier actuator intervention compared to during the baseline response (plot 408). FIG. 4 demonstrates the improvements in the engine load response, i.e., the air delivery capability of the engine. Next, in FIG. 5, improvements are demonstrated in engine torque response, which leads to improved vehicle acceleration response.

Turning to FIG. 5, a graph comparing a baseline engine torque response to an engine torque response based on the anticipated torque shortfall approach of FIG. 2 (herein also referred to as an anticipatory engine torque response) following an increase in operator torque demand is presented. Map 500 depicts an example of engine torque response over time from 1 bar brake mean effective pressure (BMEP) at steady-state load for an engine at 1750 rpm. In example, the engine is 2.7L GTDI engine.

Plot 504 shows the torque response of the baseline engine without the anticipatory torque shortfall approach. For the baseline engine torque response 504, the increase in torque demand is going up continuously at a specified rate over time with boost and air path actuators scheduled in accordance with the steady-state mode (SSM). As a result, there is an initial sluggish torque response, shown here by a plateau in engine torque during a period d1, between t1 and t2. The slower than desired increase in engine torque is caused by a torque shortfall in which the operator requested torque is greater than the torque capacity of the engine torque with wide-open throttle and no EGR. Plot 502 represents the engine torque response if an anticipated LSR has been predicted by the controller and if air path and boost actuators were scheduled in accordance with the transient response mode (TRM). During the TRM, as shown on plot 502, the torque shortfall at d1 is predicted and therefore, in anticipation of the shortfall, the controller adjusts the intake throttle and exhaust waste-gate valve based on the increased torque demand, while at the same time, scheduling HP-EGR and VCT, independently of the actual position of the intake throttle and exhaust waste-gate valve. For example, for the duration d1, the controller may hold the intake throttle at its wide-open position, hold the waste-gate valve fully closed, and concurrently, adjust an HP-EGR valve to be fully closed while advancing VCT to a timing that increases volumetric efficiency. Then, after t2, the HP-EGR valve may be opened to increase engine dilution while retarding VCT to a timing that provides a lower, nominal volumetric efficiency. In addition, the intake throttle opening and the waste-gate valve opening may be adjusted in accordance with the torque demand, as in the steady-state mode.

Turning to FIG. 6, example boost and air path actuator adjustments to enable transient torque response during an increase in operator demanded torque are shown. Map 600 depicts pedal position (PP) at plot 602. The pedal position is indicative of an operator torque demand, with the torque demand increasing as the pedal is depressed further. Map 600 depicts engine torque output at plot 604, boost pressure at plot 606, intake throttle position at plot 610, VCT adjustment at plot 612, changes in exhaust waste-gate valve position at plot 614, and HP-EGR valve position at plot 616. The waste-gate valve is opened to allow exhaust gas to bypass the turbocharger turbine, thereby spinning down the turbine to decrease boost pressure, or closed to direct more exhaust through the turbine, thereby spinning the turbine up to increase boost pressure. All plots are depicted over time along the x-axis. Time markers t1-t6 depict time points of significance during engine operation.

Between t0 and t1, responsive to low operator torque demand, the vehicle is operated with nominal settings and a relatively low engine torque output (plot 604). Boost pressure is nominal. The lower driver demand is met by partially opening the intake throttle to provide a low engine speed-load profile based on the lower driver torque demand. Also at this time, VCT (plot 612) is scheduled to a nominal position that provides lower volumetric efficiency. The waste-gate valve (plot 614) is held partially open to improve the surge margin of the intake compressor and the HP-EGR valve is partially open since engine dilution is required.

At t1, responsive to a first, small operator pedal tip in, there is a first increase in torque demand. Response to the first tip-in, intake throttle opening is increased in proportion to the increase in torque demand. At this time, a computed torque shortfall ratio between the requested torque demand and the predicted engine torque output (dashed line at 607), herein also referred to as the anticipated load shortfall ratio, aLSR (depicted by the shaded area 607), determined be less than a threshold (as indicated by the shaded area between 606 and 607 having a less then threshold area). Consequently, it may be inferred that the increase in torque demand can be satisfied by adjusting the intake throttle and without exceeding the intake throttle authority. Since the torque demand can be met by the intake throttle alone, remaining boosts and air-path actuators such as VCT, waste-gate valve, and HP-EGR valve, are maintained at their nominal settings (such as those from before t1). For example, VCT is maintained at a first schedule.

At t2, the operator actuates the accelerator pedal to command a second tip-in, larger in magnitude than the first tip-in. The second tip-in may correspond to a second increase in torque demand, large in magnitude from the first increase in torque demand (and to a higher final boost pressure). In response to the rise in torque demand, the intake throttle opening is further increased. However, only the throttle adjustment is not sufficient to meet the increase in torque demand and therefore while the intake throttle opening is increased, the waste-gate valve is adjusted to a more closed position to increase turbine speed. However, even with the intake throttle and waste-gate valve adjustment, the actual engine torque provided (dashed line at 608) is lower than the desired torque output (plot 604). The controller may predict a torque shortfall ratio and determine that aLSR (as indicated by the shaded area at between 604 and 608) is anticipated to be higher than a threshold. In response to aLSR being higher than the threshold, a controller may be configured to adjust the HP-EGR valve to a more closed position in order to reduce engine dilution. In this case, the HP-EGR valve is adjusted as a function of the aLSR, and independent of the actual positions of the intake throttle and waste-gate valve. In addition, air-path actuators such as VCT are adjusted from the first schedule to a second schedule having a more advanced timing than the first schedule, based on the new aLSR. The first schedule is at a lower volumetric efficiency than the second schedule. The new settings are then held.

At t3, the torque shortfall is satisfied wherein the actual torque output matches the desired torque output and aLSR is reduced (as shown with no shaded region). Thus, at this time, the torque output may be satisfied through adjustment of intake throttle and waste-gate valve alone. Therefore, VCT is transitioned back to the nominal timing at the first schedule, the waste-gate valve is returned to a more opened position to allow more exhaust gas to bypass the turbine, and the HP-EGR valve is returned to a more open position.

A t4, the operator actuates the accelerator pedal to command a third tip-in having a higher magnitude and final boost pressure than each of the first and second tip-ins. Responsive to the third tip-in, the intake throttle is moved to a fully open position, such as to a wide-open-throttle (WOT) position to increase airflow to provide higher boost pressure and engine torque output. Further, the controller predicts the torque shortfall ratio and determines that aLSR is higher than a threshold (as indicated by shaded area 609). To address this shortfall, the HP-EGR valve is scheduled to a more closed position to further limit HP-EGR as a function of aLSR. In addition, VCT is adjusted to a more advanced timing (than the first timing applied between t2 to t3) to provide a second higher volumetric efficiency higher than the first volumetric efficiency at t3. In addition, the waste gate valve is adjusted, independently of the VCT and EGR schedule, to a fully closed position. If the waste-gate valve position were adjusted based on the VCT and EGR, the waste-gate valve would have been actuated to a relatively more open position (as shown at 615), which would result in a decrease of exhaust pressure upstream of the turbine and lead to a reduction of boost pressure. Therefore, by adjusting the waste gate position according to the first volumetric efficiency, independent of VCT and EGR schedules, the waste-gate valve may be closed for a longer duration to provide the necessary boost pressure and engine torque output to meet the operator torque demand.

At t5, the torque shortfall has been compensated by the adjustment of the various air-path actuators. Once the boost pressure is able to sustain the requested engine torque output, the engine transitions out of a transient operating mode to a steady state mode wherein the HP-EGR valve is adjusted to a nominal, more open position, and VCT is returned to the lower volumetric efficiency nominal time setting, and further, the waste-gate valve is opened.

At t6, the operator tips out, for example, by releasing the accelerator pedal. In response to the resulting drop in torque demand, the intake throttle opening is decreased to reduce the airflow into the engine cylinders, the waste-gate valve opening is increased to a fully open position so that exhaust can bypass the turbine and decelerate the turbine, and the HP-EGR valve and VCT remains at maintained at their respective nominal setting to further decrease the engine boost pressure and boost pressure to meet the drop in operator torque demand. This allows for a smoother torque transition out of the transient increase in torque demand.

In this way, responsive to an operator torque request, an engine controller may predict a torque shortfall ratio based on the operator torque request relative to a predicted engine torque output at selected steady-state conditions; and limit exhaust gas recirculation (EGR) as a function of the shortfall ratio while actuating each of an intake throttle, coupled downstream of an intake compressor, and a waste-gate valve, coupled to an exhaust turbine, as a function of the operator torque request, the limiting and the actuating performed independent of each other. The predicting may include estimating a predicted torque shortfall as a difference between the operator-requested torque and engine torque output at current engine stead-state conditions with wide open throttle and no EGR. The predicting may further include estimating a predicted torque shortfall ratio as a ratio between the predicted torque shortfall and the operator torque request. The controller may further schedule variable cam timing (VCT) as a function of the shortfall ratio in coordination with the limiting EGR, and independent of the actuating of the intake throttle and the waste-gate valve. In one example, the EGR may include high pressure EGR recirculated from upstream of the exhaust turbine to downstream of the intake compressor. Therein, scheduling VCT in coordination with the limiting EGR may include, when the predicted torque shortfall ratio is lower than a threshold, limiting EGR while maintaining VCT at a first schedule having a lower volumetric efficiency; and when the predicted torque shortfall ratio is higher than the threshold, limiting EGR while advancing or retarding VCT from the first schedule to a second schedule having a higher volumetric efficiency.

In this way, engine torque output and boost response may be improved when there is an increase in operator torque demand. By anticipating a load shortfall ratio, different adjustment of the air-path actuators can be scheduled to provide a fast and smooth transition from transient engine operating condition to the steady state mode. In addition, by adjusting boost actuators, such as waste gate valve, independent of the VCT positions and EGR levels, the waste gate valve can be kept close for a longer duration during tip-in transients, which results in faster boost build-up and quicker engine torque response. By scheduling VCT and HP-EGR in proportion to the anticipated load shortfall ratio while scheduling boost pressure with respect to a steady-state mode of boost pressure build-up, engine load is more accurately delivered during transients while boost pressure is being built up. In addition, a smoother transition out of the transient can be provided when sufficient boost pressure has been built. By coordinating actuation of air path actuators with those of boost actuators during a transient response mode of boost pressure build-up, the engine operating mode can be quickly and smoothly returned to the steady-state mode, thereby improving fuel economy without inducing any drivability concerns. By limiting HP-EGR and moving VCT just as far as is necessary to satisfy the driver demand, unnecessarily aggressive and potentially fuel inefficient actuator adjustments are averted. In addition, the need for air and torque reserves or buffers are reduced, reducing the fuel economy penalties is associated therewith.

One example method for a turbocharged engine, comprises: in response to an operator torque demand, opening an intake throttle and closing an exhaust waste-gate valve based on the torque demand, independent of a change in exhaust gas recirculation (EGR) and variable cam timing (VCT) schedule; and concurrently scheduling the EGR and VCT based on a predicted load shortfall ratio, independent of an actual position of the intake throttle and the waste-gate valve. In the preceding example, the method additionally or optionally further comprises estimating a predicted load shortfall based on a difference between a current engine air flow and a predicted engine air flow with wide-open throttle and no EGR; and calculating the predicted load shortfall ratio based on the predicted load short fall relative to the operator torque demand. In any or all of the preceding examples, additionally or optionally, the predicted load shortfall ratio is further based on one or more of driver operating history, navigational input including road and traffic conditions, and vehicle data. In any or all of the preceding examples, additionally or optionally, opening the intake throttle and closing the waste-gate valve based on the torque demand includes estimating a target boost pressure based on the torque demand, and increasing the opening of the intake throttle while increasing the closing of the waste-gate valve as the target boost pressure increases. In any or all of the preceding examples, additionally or optionally, concurrently scheduling EGR and VCT based on the schedule when the predicted load shortfall ratio is lower than a threshold, and limiting EGR while transitioning VCT from the first schedule to a second schedule when the predicted load shortfall ratio is higher than the threshold, the first schedule having a lower volumetric efficiency than the second schedule. In any or all of the preceding examples, additionally or optionally, transitioning VCT from the first schedule to the second schedule includes advancing or retarding VCT from the lower volumetric efficiency to the higher volumetric efficiency. In any or all of the preceding examples, additionally or optionally, opening the intake throttle and closing the exhaust waste-gate valve independent of a change in the VCT schedule includes adjusting a degree of opening of the intake throttle and a degree of closing of the waste-gate valve based on the lower volumetric efficiency of the first VCT schedule. In any or all of the preceding examples, additionally or optionally, the turbocharged engine includes an exhaust turbine driving an intake compressor, the waste-gate valve coupled to the exhaust turbine, and wherein the EGR is a high pressure EGR (HP-EGR) including exhaust gas recirculated from upstream of the exhaust turbine to downstream of the intake compressor. In any or all of the preceding examples, the method additionally or optionally further comprises adjusting a low pressure EGR schedule based on the limiting of the HP-EGR, the lower pressure EGR including exhaust gas recirculated from downstream of the exhaust turbine to upstream of the intake compressor. In any or all of the preceding examples, the method additionally or optionally further comprises in response to the target boost pressure being reached, returning VCT to the first schedule with the lower volumetric efficiency and increasing EGR.

Another example method comprises: responsive to an operator torque request, predicting a torque shortfall ratio based on the operator torque request relative to a predicted engine torque output at selected steady-state conditions; limiting exhaust gas recirculation (EGR) as a function of the shortfall ratio while actuating each of an intake throttle, coupled downstream of an intake compressor, and a waste-gate valve, coupled to an exhaust turbine, as a function of the operator torque request, the limiting and the actuating performed independent of each other. In the preceding examples, additionally or optionally, the predicting includes estimating a predicted torque shortfall as a difference between the operator requested torque and engine torque output at current engine steady-state air flow conditions with wide open throttle and no EGR. In any or all of the preceding examples, additionally or optionally, the predicting further includes estimating a predicted torque shortfall ratio as a ratio between the predicted torque shortfall and the operator torque request. In any or all of the preceding examples, the method additionally or optionally further comprises scheduling variable cam timing (VCT) as a function of the shortfall ratio in coordination with the limiting EGR, and independent of the actuating of the intake throttle and the waste-gate valve. In any or all of the preceding examples, additionally or optionally, the EGR includes high pressure EGR recirculated from upstream of the exhaust turbine to downstream of the intake compressor, and wherein scheduling VCT in coordination with the limiting EGR includes: when the predicted torque shortfall ratio is lower than a threshold, limiting EGR while maintaining VCT at a first schedule having a lower volumetric efficiency; and when the predicted torque shortfall ratio is higher than the threshold, limiting EGR while advancing or retarding VCT from the first schedule to a second schedule having a higher volumetric efficiency.

Another example of an engine system comprises: an accelerator pedal for receiving an operator torque demand; an engine including an intake manifold; a turbocharger including an intake compressor, driven by an exhaust turbine, for providing a boosted air-charge to the engine; an intake throttle coupled to the intake manifold, downstream of the intake compressor; a waste-gate, including a waste-gate valve, coupled across the exhaust turbine; an exhaust gas recirculation (EGR) system including a high pressure EGR passage including an EGR valve for recirculating exhaust from upstream of the exhaust turbine to downstream of the intake compressor; a variable cam timing; a controller with computer readable instructions stored on non-transitory memory for: responsive to an increase in operator torque demand, received while operating with at least some EGR and with the VCT at a first schedule, reducing an opening of the EGR valve while transitioning the VCT to a second schedule having a higher volumetric efficiency than the first schedule; increasing an opening of the throttle while decreasing an opening of the waste-gate valve, the increasing and decreasing based on the first schedule of the VCT. In the preceding examples, additionally or optionally, the reducing an opening of the EGR valve is based on a ratio between desired engine air flow corresponding to the increased operator torque demand and predicted engine air flow at wide open throttle, with the EGR valve fully closed and VCT at the first schedule. In any or all of the preceding examples, additionally or optionally, the increasing and decreasing based on the first schedule of the VCT includes, responsive to the operator torque demand, holding the intake throttle more open and holding the waste-gate valve more closed based on a lower volumetric efficiency of the first schedule, even as the VCT is transitioned to the higher volumetric efficiency of the second schedule. In any or all of the preceding examples, additionally or optionally, the controller includes further instructions for: responsive to the operator torque demand being met, increasing the opening of the EGR valve while returning the VCT to the first schedule; decreasing an opening of the throttle while increasing an opening of the waste-gate valve, each of the increasing and decreasing based on the first schedule of the VCT. In any or all of the preceding examples, additionally or optionally, the EGR system further includes a low pressure EGR passage including another EGR valve for recirculating exhaust from downstream of the exhaust turbine to upstream of the intake compressor, and wherein the controller includes further instructions for: adjusting an opening of the another EGR valve responsive to each of the operator torque demand and the reducing an opening of the EGR valve.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a turbocharged engine, comprising:
in response to an operator torque demand,
opening an intake throttle and closing an exhaust waste-gate valve based on the torque demand, independent of a change in exhaust gas recirculation (EGR) and variable cam timing (VCT) schedule; and
concurrently scheduling the EGR and the VCT based on a predicted load shortfall ratio, independent of an actual position of the intake throttle and the waste-gate valve.

2. The method of claim 1, further comprising:
estimating a predicted load shortfall based on a difference between a current engine air flow and a predicted engine air flow with wide-open throttle and no EGR; and
calculating the predicted load shortfall ratio based on the predicted load shortfall relative to the operator torque demand.

3. The method of claim 2, wherein the predicted load shortfall ratio is further based on one or more of driver operating history, navigational input including road and traffic conditions, and vehicle data.

4. The method of claim 1, wherein opening the intake throttle and closing the waste-gate valve based on the torque demand includes estimating a target boost pressure based on the torque demand, and increasing the opening of the intake throttle while increasing the closing of the waste-gate valve as the target boost pressure increases.

5. The method of claim 1, wherein concurrently scheduling the EGR and the VCT based on the predicted load shortfall ratio includes limiting the EGR while maintaining the VCT at a first schedule when the predicted load shortfall ratio is lower than a threshold, and limiting the EGR while transitioning the VCT from the first schedule to a second schedule when the predicted load shortfall ratio is higher than the threshold, the first schedule having a lower volumetric efficiency than the second schedule.

6. The method of claim 5, wherein transitioning the VCT from the first schedule to the second schedule includes advancing or retarding the VCT from the lower volumetric efficiency to a higher volumetric efficiency.

7. The method of claim 5, wherein opening the intake throttle and closing the waste-gate valve independent of the change in the VCT schedule includes adjusting a degree of opening of the intake throttle and a degree of closing of the waste-gate valve based on the lower volumetric efficiency of the first VCT schedule.

8. The method of claim 5, wherein the turbocharged engine includes an exhaust turbine driving an intake compressor, the waste-gate valve coupled to the exhaust turbine, and wherein the EGR is a high pressure EGR (HP-EGR) including exhaust gas recirculated from upstream of the exhaust turbine to downstream of the intake compressor.

9. The method of claim 8, further comprising adjusting a low pressure EGR schedule based on the limiting of the HP-EGR, lower pressure EGR including exhaust gas recirculated from downstream of the exhaust turbine to upstream of the intake compressor.

10. The method of claim 5, further comprising, in response to a target boost pressure being reached, returning the VCT to the first schedule with the lower volumetric efficiency and increasing the EGR.

11. A method, comprising:
responsive to an operator torque request,
predicting a torque shortfall ratio based on the operator torque request relative to a predicted engine torque output at selected steady-state conditions; and
limiting exhaust gas recirculation (EGR) as a function of the torque shortfall ratio via adjusting an EGR valve while actuating each of an intake throttle, coupled downstream of an intake compressor, and a waste-gate valve, coupled to an exhaust turbine, as a function of the operator torque request, and the limiting and the actuating performed independent of each other.

12. The method of claim 11, wherein the predicting includes estimating a predicted torque shortfall as a difference between the operator torque request and the predicted engine torque output at selected steady-state conditions of engine air flow with wide open throttle and no EGR.

13. The method of claim 12, wherein the predicting further includes estimating the predicted torque shortfall ratio as a ratio between the predicted torque shortfall and the operator torque request.

14. The method of claim 11, further comprising scheduling variable cam timing (VCT) as a function of the predicted torque shortfall ratio independent of the actuating of the intake throttle and the waste-gate valve.

15. The method of claim 14, wherein the EGR includes high pressure EGR recirculated from upstream of the exhaust turbine to downstream of the intake compressor, and wherein scheduling the VCT includes:
   when the predicted torque shortfall ratio is lower than a threshold, limiting the EGR while maintaining the VCT at a first schedule having a lower volumetric efficiency; and
   when the predicted torque shortfall ratio is higher than the threshold, limiting the EGR while advancing or retarding the VCT from the first schedule to a second schedule having a higher volumetric efficiency.

16. An engine system, comprising:
   an accelerator pedal for receiving an operator torque demand;
   an engine including an intake manifold;
   a turbocharger including an intake compressor, driven by an exhaust turbine, for providing a boosted air-charge to the engine;
   an intake throttle coupled to the intake manifold, downstream of the intake compressor;
   a waste-gate, including a waste-gate valve, coupled across the exhaust turbine;
   an exhaust gas recirculation (EGR) system including a high pressure EGR passage including an EGR valve for recirculating exhaust from upstream of the exhaust turbine to downstream of the intake compressor;
   a variable cam timing (VCT); and
   a controller with computer readable instructions stored on non-transitory memory for:
      responsive to an increase in the operator torque demand, received while operating with at least some EGR and with the VCT at a first schedule,
         reducing an opening of the EGR valve while transitioning the VCT to a second schedule having a higher volumetric efficiency than the first schedule; and
         increasing an opening of the intake throttle while decreasing an opening of the waste-gate valve, the increasing and decreasing based on the first schedule of the VCT.

17. The system of claim 16, wherein the reducing the opening of the EGR valve is based on a ratio between desired engine air flow corresponding to the increased operator torque demand and predicted engine air flow at wide open throttle, with the EGR valve fully closed and the VCT at the first schedule.

18. The system of claim 16, wherein the increasing and decreasing based on the first schedule of the VCT includes, responsive to the operator torque demand, holding the intake throttle more open and holding the waste-gate valve more closed based on a lower volumetric efficiency of the first schedule, even as the VCT is transitioned to the higher volumetric efficiency of the second schedule.

19. The system of claim 16, wherein the controller includes further instructions for:
   responsive to the operator torque demand being met,
      increasing the opening of the EGR valve while returning the VCT to the first schedule; and
      decreasing the opening of the intake throttle while increasing the opening of the waste-gate valve, each of the increasing and decreasing based on the first schedule of the VCT.

20. The system of claim 16, wherein the EGR system further includes a low pressure EGR passage including another EGR valve for recirculating exhaust from downstream of the exhaust turbine to upstream of the intake compressor, and wherein the controller includes further instructions for:
   adjusting an opening of the other EGR valve responsive to each of the operator torque demand and the reducing the opening of the EGR valve.

* * * * *